US008711820B2

(12) United States Patent
Grandhi

(10) Patent No.: US 8,711,820 B2
(45) Date of Patent: Apr. 29, 2014

(54) METHOD AND APPARATUS FOR PROVIDING VERY HIGH THROUGHPUT OPERATION AND CAPABILITY SIGNALING FOR WIRELESS COMMUNICATIONS

(75) Inventor: Sudheer A. Grandhi, Pleasanton, CA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 12/945,278

(22) Filed: Nov. 12, 2010

(65) Prior Publication Data

US 2011/0110349 A1 May 12, 2011

Related U.S. Application Data

(60) Provisional application No. 61/260,552, filed on Nov. 12, 2009, provisional application No. 61/260,639, filed on Nov. 12, 2009.

(51) Int. Cl.
*H04W 4/00* (2009.01)

(52) U.S. Cl.
USPC .......................................... 370/338; 370/254

(58) Field of Classification Search
USPC ................................ 370/254, 310, 328, 338
See application file for complete search history.

(56) References Cited

U.S. PATENT DOCUMENTS

| | | | | |
|---|---|---|---|---|
| 8,175,047 | B2 | 5/2012 | Seok et al. | |
| 2006/0253736 | A1 | 11/2006 | Rudolf et al. | |
| 2007/0258384 | A1 | 11/2007 | Sammour et al. | |
| 2009/0310692 | A1 * | 12/2009 | Kafle et al. | 375/260 |
| 2010/0074190 | A1 * | 3/2010 | Cordeiro et al. | 370/329 |
| 2010/0091716 | A1 * | 4/2010 | Bonta et al. | 370/329 |
| 2011/0026623 | A1 * | 2/2011 | Srinivasa et al. | 375/260 |
| 2011/0044273 | A1 * | 2/2011 | Maltsev et al. | 370/329 |
| 2011/0051711 | A1 | 3/2011 | Kishiyama et al. | |
| 2011/0090821 | A1 * | 4/2011 | Seok | 370/255 |
| 2011/0096747 | A1 * | 4/2011 | Seok | 370/329 |
| 2011/0103264 | A1 * | 5/2011 | Wentink | 370/255 |
| 2011/0128900 | A1 * | 6/2011 | Seok | 370/311 |
| 2011/0188487 | A1 * | 8/2011 | Seok | 370/338 |
| 2011/0305216 | A1 * | 12/2011 | Seok | 370/329 |
| 2012/0087300 | A1 * | 4/2012 | Seok | 370/315 |
| 2012/0128090 | A1 * | 5/2012 | Seok | 375/267 |

FOREIGN PATENT DOCUMENTS

WO 2006031495 A2 3/2006

OTHER PUBLICATIONS

Institute of Electrical and Electronics Engineers, "Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 5: Enhancements for Very High Throughput in the 60 GHz Band," IEEE P802.11ad/D1.0, Sep. 2010.

(Continued)

*Primary Examiner* — Paul H Masur
(74) *Attorney, Agent, or Firm* — Volpe and Koenig, P.C.

(57) ABSTRACT

A method and apparatus may be used to provide signaling for various capabilities in various wireless communication technologies, such as very high throughput (VHT) Capabilities in VHT wireless local area networks (WLANs). For example, in WLAN, an access point (AP) and/or a station (STA) may indicate VHT Capabilities Information, in any new or existing frames. The VHT Capabilities Information may be indicated in management frames such as association, re-association, probe, beacon, or secondary/auxiliary beacon frames.

20 Claims, 7 Drawing Sheets

(56) References Cited

OTHER PUBLICATIONS

Institute of Electrical and Electronics Engineers, "Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Enhancements for Higher Throughput in the 60 GHz Band," IEEE P802.11ad/D1.0, Sep. 2010.

Institute of Electrical and Electronics Engineers, Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Enhancements for Higher Throughput, IEEE P802.11n/D2.0, Feb. 2007.

LAN/MAN Committee of the IEEE Society, "Draft Standard for information technology—Telecommunications and information exchange between systems—Local metropolitan area networks—Specifics requirements Part 11: Wireless LAN Medium Control (MAC) and Physical Layer (PHY) specifications," IEEE, P802.11-REVma/D9.0, Dec. 2006.

* cited by examiner

METHOD AND APPARATUS FOR PROVIDING VERY HIGH THROUGHPUT OPERATION AND CAPABILITY SIGNALING FOR WIRELESS COMMUNICATIONS

CROSS REFERENCE TO RELATED APPLICATIONS

This application claims the benefit of U.S. 61/260,552 filed Nov. 12, 2009 and 61/260,639 filed Nov. 12, 2009, the contents of which are hereby incorporated by reference herein

FIELD OF INVENTION

This application is related to wireless communications.

BACKGROUND

The earliest version of the IEEE 802.11 standard provided a data rate of 1 Mbps. In a subsequent amendment, namely IEEE 802.11b, a physical layer data rate of 11 Mbps was provided. With the introduction of orthogonal frequency division multiplexing (OFDM) in the IEEE 802.11g and IEEE 802.11a amendments for 2.4 GHz and 5 GHz bands respectively, the data rates supported were increased to 54 Mbps at the physical (PHY) layer. The IEEE 802.11n amendment increased the data rates supported to 100 Mbps on top of the MAC layer.

Wireless Local Area Networks (WLANs) with very high throughput (VHT) of greater than 100 Mbps on top of the MAC layer are being designed. VHT WLANs may also include features such as multi-user multiple-input multiple-output (MU-MIMO) techniques, coding features, power save features, and the like. MU-MIMO technology enables simultaneous transmission to multiple WTRUs on the same frequency, and also simultaneous reception from multiple WTRUs on the same frequency. VHT protection features for VHT packet transmission and legacy packet transmission will also be needed. In a scenario with densely deployed VHT APs, overlapping basic service set (OBSS) management is necessary because of high interference from neighboring BSSes. In a television white space (TVWS) scenario, independently operated networks/devices, (and even dissimilar networks/devices in radio technology), are expected to coexist and operate in the same common TVWS frequency spectrum. These are just a sample of the features and capabilities needed in VHT WLANs.

SUMMARY

A method and apparatus provide signaling for very high throughput (VHT) operation in VHT wireless local area networks (WLANs). An access point (AP) may control the operation of VHT wireless transmit/receive units (WTRUs) in a basic service set (BSS) by sending VHT operation or capabilities information. A WTRU may also send VHT operation or capability information to the AP.

BRIEF DESCRIPTION OF THE DRAWINGS

A more detailed understanding may be had from the following description, given by way of example and to be understood in conjunction with the accompanying drawings.

DETAILED DESCRIPTION

The term "wireless transmit/receive unit (WTRU)" includes but is not limited to a station (WTRU), a user equipment (UE), a mobile station, a fixed or mobile subscriber unit, a pager, a cellular telephone, a personal digital assistant (PDA), a computer, a mobile internet device (MID) or any other type of device capable of operating in a wireless environment.

When referred to hereafter, the terminology "AP" includes but is not limited to a base station (BS), a Node-B, a site controller, or any other type of interfacing device capable of operating in a wireless environment.

The embodiments are described generally in a WLAN context, but the various embodiments may be implemented in any wireless communication technology. Some example types of wireless communication technologies include, but are not limited to, Worldwide Interoperability for Microwave Access (WiMAX), 802.xx, Global System for Mobile communications (GSM), Code Division Multiple Access (CDMA2000), Universal Mobile Telecommunications System (UMTS), Long Term Evolution (LTE), or any future technology.

Infrastructure Discussion

Figure 1A:
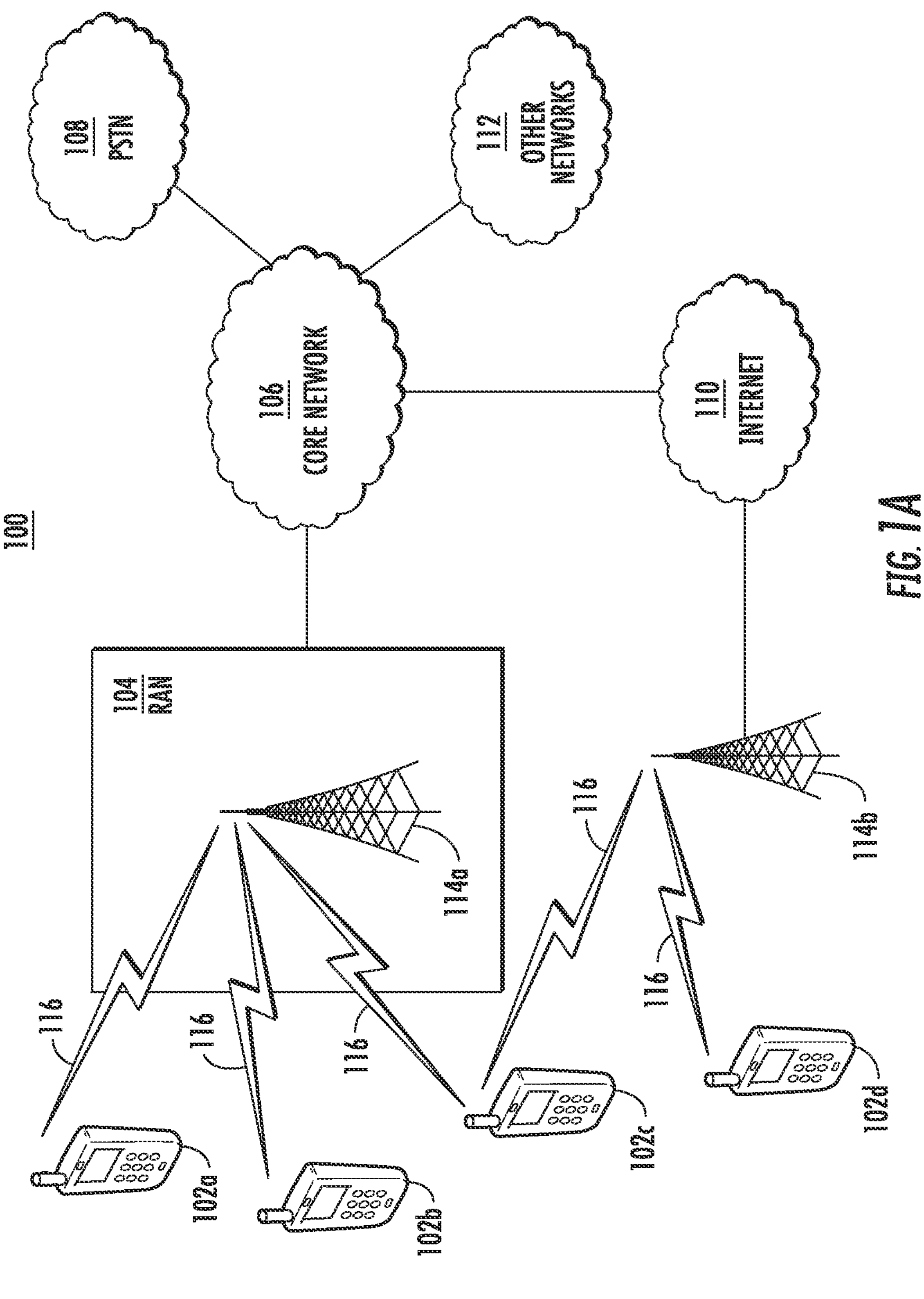
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102*a*, 102*b*, 102*c*, 102*d*, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d* may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114*a* and a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the core network 106, the Internet 110, and/or the networks 112. By way of example, the base stations 114*a*, 114*b* may be a base transceiver station (BTS), a Node-B, an eNode B, a Home Node B, a Home eNode B, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104, which may also include other base stations and/or network elements (not shown), such as a base station controller (BSC), a radio network controller (RNC), relay nodes, etc. The base station 114*a* and/or the base station 114*b* may be configured to transmit and/or receive wireless signals within a particular geographic region, which may be referred to as a cell (not shown). The cell may further be divided into cell sectors. For example, the cell associated with the base station 114*a* may be divided into three sectors. Thus, in one embodiment, the base station 114*a* may include three transceivers, i.e., one for each sector of the cell. In another embodiment, the base station 114*a* may employ multiple-input multiple output (MIMO) technology and, therefore, may utilize multiple transceivers for each sector of the cell.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114*a* and the WTRUs 102*a*, 102*b*, 102*c* may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114*b* and the WTRUs 102*c*, 102*d* may implement a radio technology such as IEEE 802.11 to establish a wireless local area network (WLAN). In another embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, etc.) to establish a picocell or femtocell. As shown in FIG. 1A, the base station 114*b* may have a direct connection to the Internet 110. Thus, the base station 114*b* may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102*a*, 102*b*, 102*c*, 102*d*. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102*a*, 102*b*, 102*c*, 102*d* in the communications system 100 may include multi-mode capabilities, i.e., the WTRUs 102*a*, 102*b*, 102*c*, 102*d* may include multiple transceivers for communicating with different wireless networks over different wireless links. For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
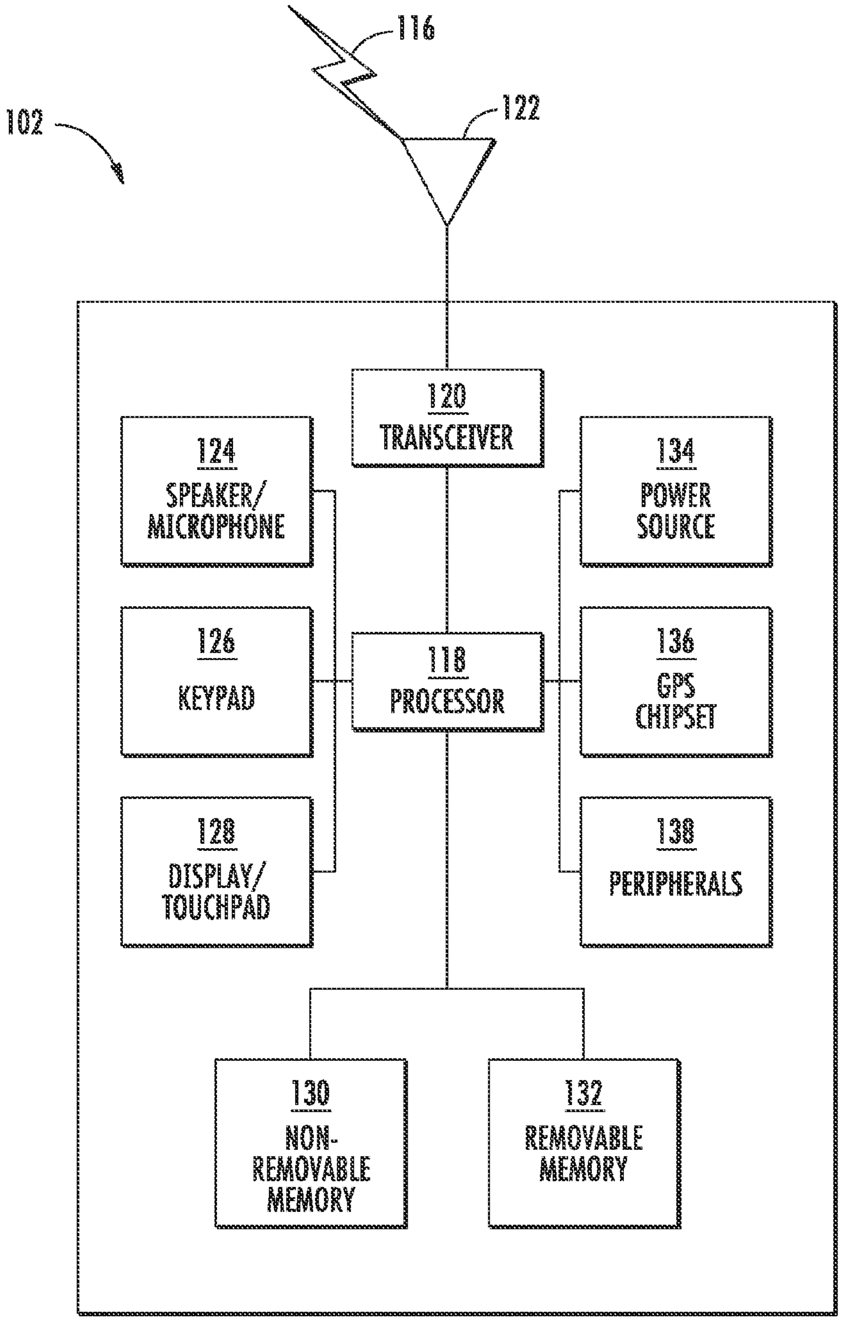
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
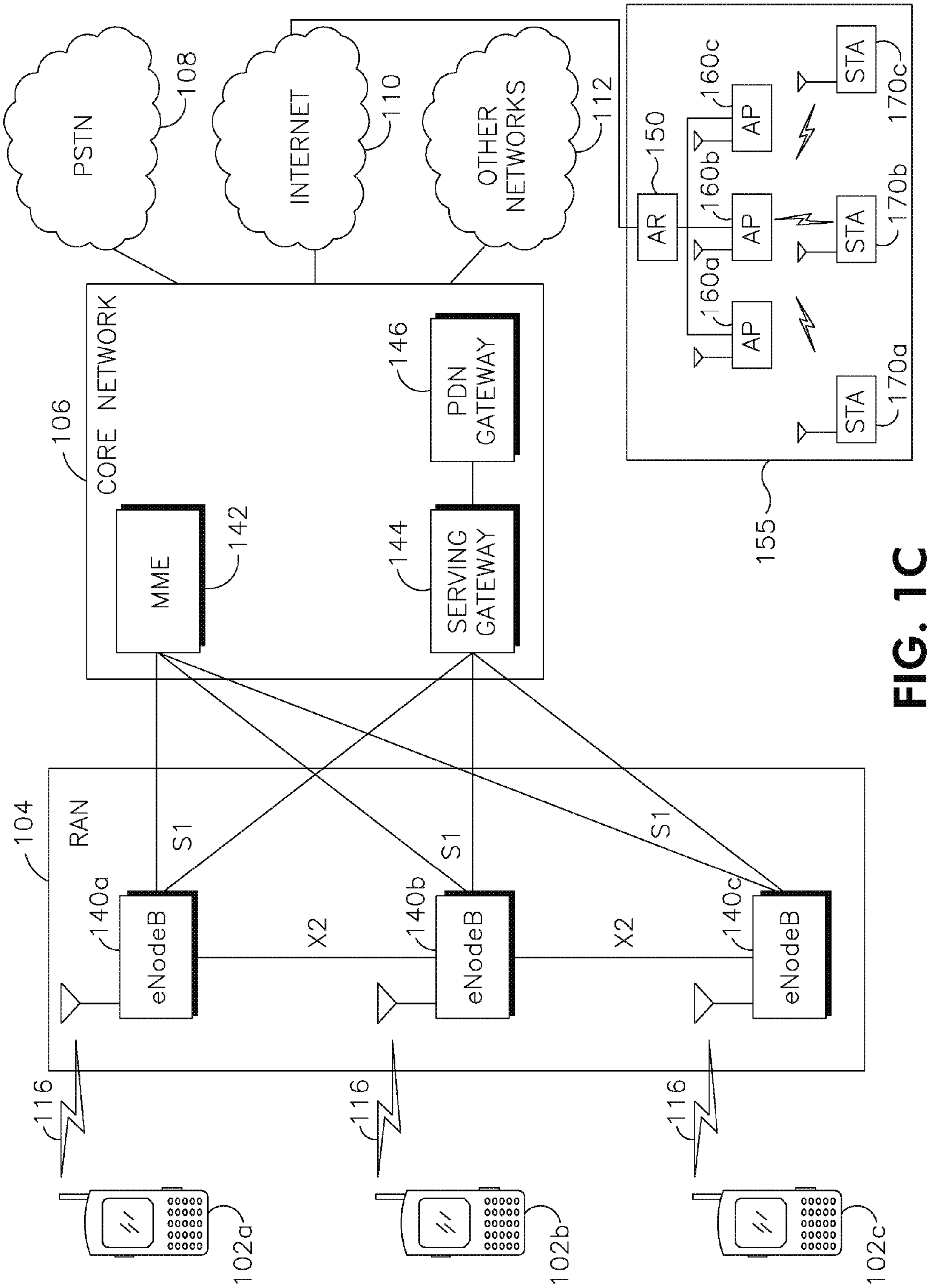
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102*a*, 102*b*, 102*c* over the air interface 116. The RAN 104 may also be in communication with the core network 106.

The RAN 104 may include eNode-Bs 140*a*, 140*b*, 140*c*, though it will be appreciated that the RAN 104 may include any number of eNode-Bs while remaining consistent with an embodiment. The eNode-Bs 140*a*, 140*b*, 140*c* may each include one or more transceivers for communicating with the WTRUs 102*a*, 102*b*, 102*c* over the air interface 116. In one embodiment, the eNode-Bs 140*a*, 140*b*, 140*c* may implement MIMO technology. Thus, the eNode-B 140*a*, for example, may use multiple antennas to transmit wireless signals to, and receive wireless signals from, the WTRU 102*a*.

Each of the eNode-Bs 140*a*, 140*b*, 140*c* may be associated with a particular cell (not shown) and may be configured to handle radio resource management decisions, handover decisions, scheduling of users in the uplink and/or downlink, and the like. As shown in FIG. 1C, the eNode-Bs 140*a*, 140*b*, 140*c* may communicate with one another over an X2 interface.

The core network 106 shown in FIG. 1C may include a mobility management gateway (MME) 142, a serving gateway 144, and a packet data network (PDN) gateway 146.

While each of the foregoing elements are depicted as part of the core network 106, it will be appreciated that any one of these elements may be owned and/or operated by an entity other than the core network operator.

The MME 142 may be connected to each of the eNode-Bs 142*a*, 142*b*, 142*c* in the RAN 104 via an S1 interface and may serve as a control node. For example, the MME 142 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 142 may also provide a control plane function for switching between the RAN 104 and other RANs (not shown) that employ other radio technologies, such as GSM or WCDMA.

The serving gateway 144 may be connected to each of the eNode Bs 140*a*, 140*b*, 140*c* in the RAN 104 via the S1 interface. The serving gateway 144 may generally route and forward user data packets to/from the WTRUs 102*a*, 102*b*, 102*c*. The serving gateway 144 may also perform other functions, such as anchoring user planes during inter-eNode B handovers, triggering paging when downlink data is available for the WTRUs 102*a*, 102*b*, 102*c*, managing and storing contexts of the WTRUs 102*a*, 102*b*, 102*c*, and the like.

The serving gateway 144 may also be connected to the PDN gateway 146, which may provide the WTRUs 102*a*, 102*b*, 102*c* with access to packet-switched networks, such as the Internet 110, to facilitate communications between the WTRUs 102*a*, 102*b*, 102*c* and IP-enabled devices. An access router (AR) 150 of a wireless local area network (WLAN) 155 may be in communication with the Internet 110. The AR 150 may facilitate communications between APs 160*a*, 160*b*, and 160*c*. The APs 160*a*, 160*b*, and 160*c* may be in communication with WTRUs 170*a*, 170*b*, and 170*c*.

The core network 106 may facilitate communications with other networks. For example, the core network 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the core network 106 may include, or may communicate with, an IP gateway, (e.g., an IP multimedia subsystem (IMS) server), that serves as an interface between the core network 106 and the PSTN 108. In addition, the core network 106 may provide the WTRUs 102*a*, 102*b*, 102*c* with access to the networks 112, which may include other wired or wireless networks that are owned and/or operated by other service providers.

Figure 2:
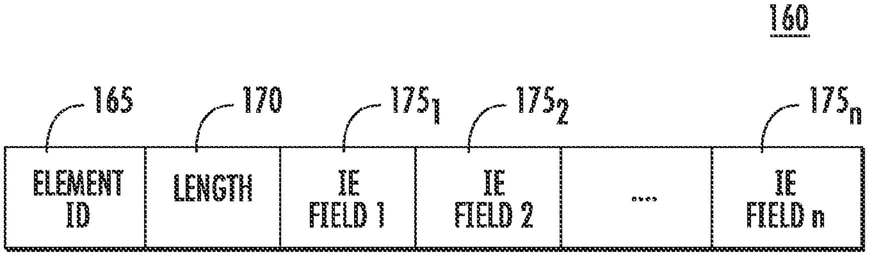
FIG. 2 shows the format of an information element (IE).

FIG. 2 shows an information element (IE) 160 in a medium access control (MAC) frame for the purpose of transferring information. A first field of the IE is an element identity (ID) field 165 that contains an ID specific to the IE. This is followed by a length field 170 that contains the length of the IE. The length field 170 is followed by a variable number of fields $\mathbf{175}_1$, $\mathbf{175}_2$, . . . , $\mathbf{175}_n$ specific to the IE 160.

Figure 3:
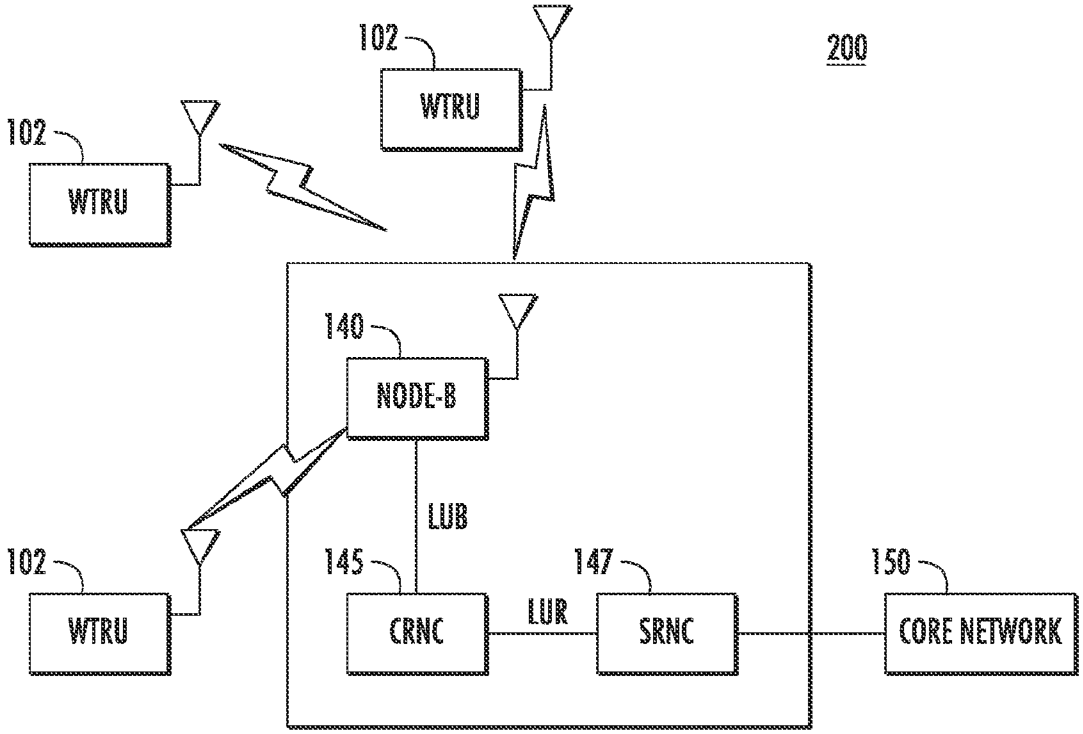
FIG. 3 shows a wireless communication system/access network.

FIG. 3 shows a wireless communication system 200 including a plurality of WTRUs 102, a Node-B 140, a controlling radio network controller (CRNC) 145, a serving radio network controller (SRNC) 147, and a core network 150.

As shown in FIG. 3, the WTRUs 102 are in communication with the Node-B 140, which is in communication with the CRNC 145 and the SRNC 147. Although three WTRUs 102, one Node-B 140, one CRNC 145, and one SRNC 147 are shown in FIG. 3, it should be noted that any combination of wireless and wired devices may be included in the wireless communication system 200.

Figure 4:
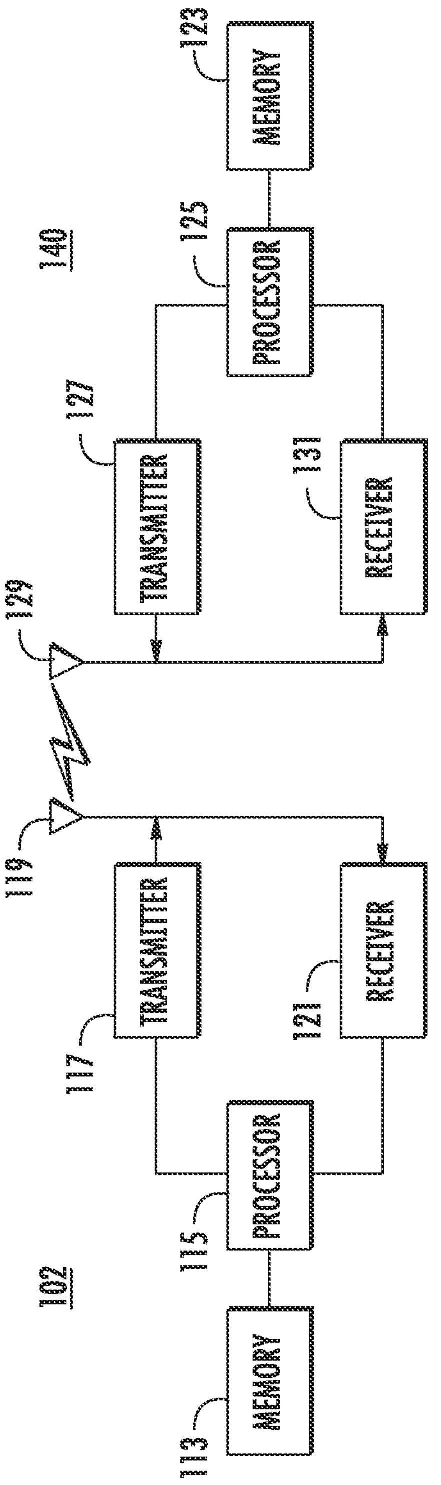
FIG. 4 shows and example of a functional block diagram of a WTRU and a Node-B of the wireless communication system of FIG. 3.

FIG. 4 is a functional block diagram of a WTRU 102 and the AP 140 of the wireless communication system 200 of FIG. 2. As shown in FIG. 4, the WTRU 102 is in communication with the Node-B 120 and both are configured to perform a method and apparatus for providing very high throughput operation signaling for WLANs.

In addition to the components that may be found in a typical WTRU, the WTRU 102 includes a processor 115, a receiver 121, a transmitter 117, a memory 113 and an antenna 119. The memory 113 is provided to store software including operating system, application, etc. The processor 115 is provided to perform, alone or in association with the software, a method and apparatus for providing very high throughput operation signaling for WLANs. The receiver 121 and the transmitter 117 are in communication with the processor 115. The antenna 119 is in communication with both the receiver 121 and the transmitter 117 to facilitate the transmission and reception of wireless data.

In addition to the components that may be found in a typical base station, the AP 140 includes a processor 125, a receiver 131, a transmitter 127, and an antenna 129. The processor 125 is configured to perform a method and apparatus for providing very high throughput operation signaling for WLANs. The receiver 131 and the transmitter 127 are in communication with the processor 125. The antenna 129 is in communication with both the receiver 131 and the transmitter 127 to facilitate the transmission and reception of wireless data.

A wireless local area network (WLAN) in infrastructure basic service set (BSS) mode has an access point (AP) for the BSS and one or more wireless transmit/receive units (WTRUs) associated with the AP. The AP may have access or interface to a distribution system (DS) or another type of wired/wireless network that carries traffic in and out of the BSS. Traffic sent to WTRUs that originates from outside the BSS, arrives through the AP and is delivered to the WTRUs. Traffic originating from WTRUs to destinations outside the BSS is sent to the AP to be delivered to the respective destinations. Traffic between WTRUs within the BSS may also be sent to through the AP where the source WTRU sends traffic to the AP, and the AP delivers the traffic to the destination WTRU. Such traffic between WTRUs within a BSS is peer-to-peer traffic. Such peer-to-peer traffic may also be sent directly between the source and destination WTRUs with a direct link setup (DLS), such as that described in IEEE 802.11e regarding DLS or IEEE 802.11z regarding tunneled DLS.

VHT Operation Information

In VHT WLANs, certain VHT features in medium access control (MAC) and physical layers may be needed. These VHT features may be specific to the VHT WLANs being designed for data rates in excess of 100 Mbps on top of the MAC layer. A given VHT feature may have more than one parameter and option associated with it. Moreover, the feature parameter may take more than one value. Sometimes, the VHT feature itself may be optional. As a result, there could be more than one mode of operation for a VHT AP or VHT WTRU in an infrastructure BSS, based on the chosen feature option and parameters. This may be due to the different implementations of VHT AP and VHT WTRUs. This may, however, be true even if all VHT WTRUs have an identical implementation because of the different feature options and parameters chosen. So the VHT AP may be able to set the VHT features, VHT feature options, and VHT feature parameters in a dynamic way for the BSS operation to adapt to various operation scenarios.

By sending VHT operation information to the WTRUs in the BSS, a VHT AP may control the VHT WTRU's operation in the BSS and allow adaptation to various operation scenarios. These various operation scenarios may arise for example due to different traffic types, traffic loads or quality of service (QoS) requirements. For instance, in one scenario, a legacy WTRU, (i.e., a non-VHT WTRU from older technology), may associate with the BSS, and the VHT AP will need to indicate this as part of the VHT operation information so that VHT WTRUs will operate in a manner so as to coexist with the legacy WTRU.

The VHT operation information may be included by a VHT AP, in any new or existing management/control/data frames like in management frames such as the beacon, secondary/auxiliary beacon, or probe response frames.

Figure 5:
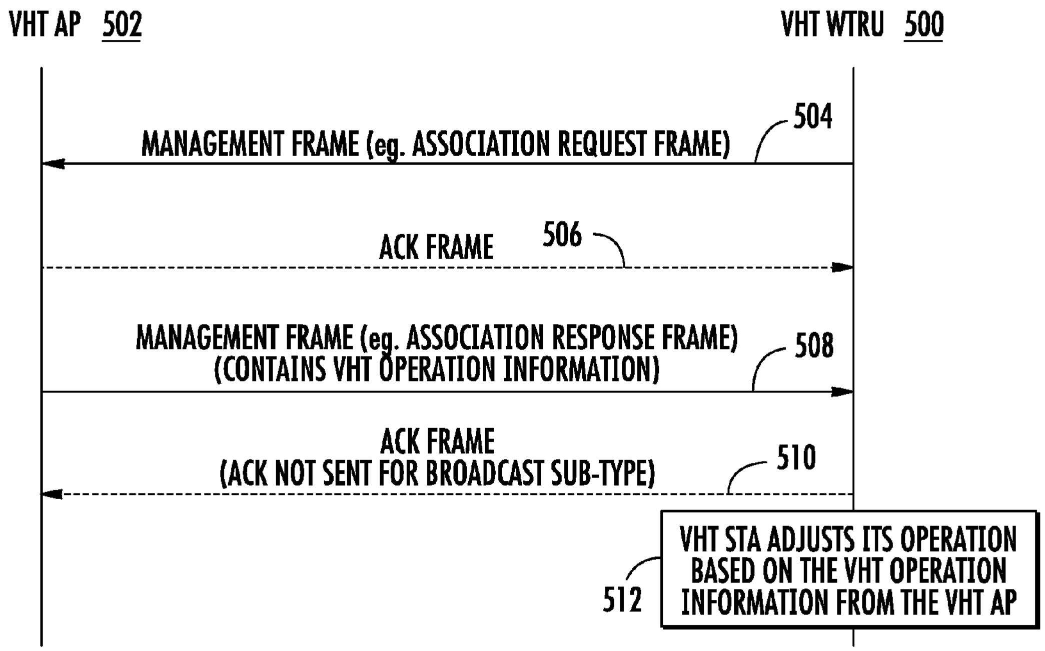
FIG. 5 shows and an example of VHT operation information sent in management frames.

FIG. 5 shows an example of VHT operation information sent in management frames. The VHT WTRU 500 sends an Association Request Frame 504 to the VHT AP 502. The association request frame 504 enables the access point to allocate resources for and synchronize with a WTRU. This association request frame 504 carries information about the WTRU (e.g., supported data rates). After sending an acknowledgement 506, the VHT AP 502 sends an association response frame 508 containing VHT operation information, such as that described in detail in Table 1 below. The association response frame 508 may also contain an acceptance or rejection notice to the WTRU 500 requesting association. If the access point 502 accepts the WTRU, the response frame 508 includes information regarding the association, such as association ID and supported data rates. After sending an acknowledgement 510, the VHT WTRU 500 may adjust its operating mode 512.

Figure 6:
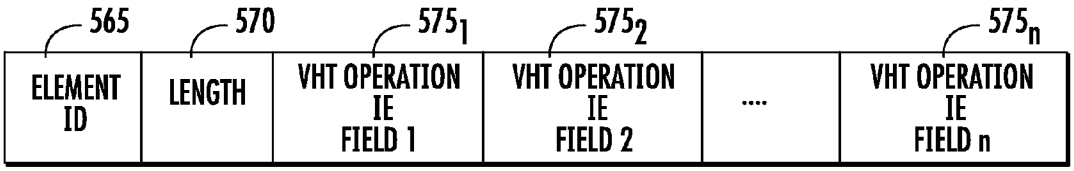
FIG. 6 shows an illustration of VHT operation IE format.

The VHT operation information may be formatted as a newly defined VHT operation IE. FIG. 6 shows a structure of such a VHT operation IE. The element ID field 565 of the VHT operation IE has a newly defined value specifically for the VHT operation IE. The length field 570 contains the length of the VHT operation IE following the length field 570 or the total IE length. The fields 575 in the VHT operation IE, following the element ID field 565 and length field 570, may contain some or all of the VHT operation information described later. For example, in FIG. 6, there are "n" such fields. Note that one may choose any specific mapping of these fields to the VHT operation information and several mappings are possible and allowed within the scope of this invention.

The VHT AP controls the operation of VHT WTRUs in a BSS by using a VHT operational IE. The VHT operation IE may be included by an AP, in any new or existing management/control/data frames, especially in management frames such as the beacon, secondary/auxiliary beacon, or probe response frames.

The VHT operation information or VHT operation IE may include information related to one or more VHT operation information items from Table 1 below. The VHT operation information may include parameters, options, and operation indication for each VHT operation information item in Table 1.

TABLE 1

| VHT Operation Information items | Description |
|---|---|
| VHT Primary Channel | Channel number of channel considered as the primary channel (i.e. common channel of operation for all VHT devices in the VHT BSS) by the VHT AP in the BSS. |
| Secondary Channel Offsets (relative to the VHT primary channel) for one or more secondary channels (for 20/40/80 MHz total bandwidth) | Depending on the bandwidth of operation (20/40/80 MHz), there may be one or more secondary channels for the VHT BSS operation. An example of the possible secondary channel configurations and corresponding values (note that the exact numerical value may be chosen flexibly from the currently unused values within the range from 0 to 255) for the Secondary Channel Offset field corresponding to the VHT 80 MHz bandwidth transmission, VHT 40 MHz bandwidth transmission and VHT Multi-channel transmission is shown in Table 2, below. In one embodiment, the modified Secondary Channel Offset field which includes values for secondary channel configurations supporting VHT 80 MHz bandwidth transmission, VHT 40 MHz bandwidth transmission and VHT Multi-channel transmission may be included in: (1) the beacon, probe response, association response, and reassociation response frames sent by the AP or an WTRU in an Independent BSS (2) a VHT Operation IE included in frames sent by an AP or an WTRU in an Independent BSS (3) Channel Switch Announcement (Action) frame sent by the AP or an WTRU in an Independent BSS (4) a VHT Capabilities IE included in frames sent by an AP or an WTRU. |
| VHT WTRU channel widths that may be used to transmit to WTRUs | The VHT BSS may support transmission in more than one bandwidth for example 20/40/80 MHz. |

TABLE 1-continued

| VHT Operation Information items | Description |
|---|---|
| RIFS mode support in VHT communication | Reduced inter frame space (RIFS) mode may be supported in the VHT BSS to increase medium usage efficiency. |
| Protection requirements indication for transmission of VHT packets | In VHT WLANs there need to be protection requirements for VHT transmissions to account for various scenarios such as: (1) various bandwidths of operation (2) devices of different capabilities etc. |
| Non-Greenfield VHT WTRUs present indication | When VHT WTRUs that are not VHT-Greenfield capable are present then appropriate protection mechanisms should be used for VHT transmissions that use the VHT-Greenfield format. |
| Overlapping BSS (OBSS) Non-VHT WTRUs present indication | When OBSS Non-VHT WTRUs are present then VHT-Greenfield transmissions should not be allowed in the BSS. |
| Multiple Beacon transmission indication | Multiple beacons may be transmitted in a VHT BSS for example VHT space-time block code (STBC) beacon in addition to the regular beacon. |
| Multiple clear-to-send (CTS) protection usage indication | Multiple CTS protection may be used to set network allocation vector (NAV) hen there exist VHT devices with different physical layer technologies, (e.g., STBC and non-STBC), that need protection for their packets. |
| VHT STBC Beacon indication | Indication whether the beacon containing this field is a VHT STBC beacon or not. |
| Legacy Protection Full Support in the VHT BSS | Indicates whether all the VHT WTRUs in the BSS support legacy signal protection mechanisms (e.g., L-SIG transmission opportunity (TXOP)). |
| VHT phased coexistence operation (PCO) active | Indicates whether VHT PCO (where the VHT AP divides time between 20/40/80 MHz bandwidth operation) is active in the BSS. |
| VHT PCO Phase | Indicates which VHT PCO phase is in operation (e.g., 20/40/80 MHz phase). |
| Basic MCS Set for VHT | Basic modulation and coding scheme (MCS) set is the set of MCS values that are supported by all VHT WTRUs in the BSS. |
| Power Control for VHT in use | Indicates that the power control mechanisms for VHT are in use in the BSS. |
| Indication of orthogonal frequency division multiple access (OFDMA) in use | OFDMA may be employed in VHT WLAN by making channel/sub-carrier assignments for traffic/users. |
| Indication of frequency reuse mechanisms | Frequency reuse mechanisms may be employed to coexist with neighboring VHT APs/OBSSs An example is increasing spectrum efficiency by reusing some frequencies from the frequency spectrum more often for WTRUs closer to the AP. This may alleviate the spectrum scarcity problem in densely deployed VHT APs, (i.e., interfering neighboring/overlapping BSSs). |
| Indication of OBSS management | VHT WLANs will have to adopt Overlapping BSS coping mechanisms to deal with the excessive channel reuse and interference in scenarios with densely deployed VHT APs. |
| Indication of coexistence mechanisms | VHT WLANs will need APs/WTRUs to support parameters, rules, policies, mechanisms and regulatory information for coexistence (e.g., inter-BSS, inter-system or television white space (TVWS)). |

TABLE 2

Secondary channel configurations.

| Value | Description |
|---|---|
| 0 | Indicates that no secondary channel is present (just 20 MHz). |
| 1 | Indicates that the secondary channel is above the primary channel (for 40 MHz). |
| 2 | Not used. |
| 3 | Indicates that the secondary channel is below the primary channel (for 40 Hz). |
| Any unused value from 0 to 256 (flexible) | Indicates 3 secondary channels immediately above the primary channel (80 MHz bandwidth formed by 4 contiguous 20 MHz channels). |
| Any unused value from 0 to 256 (flexible) | Indicates 3 secondary channels immediately below the primary channel (80 MHz bandwidth formed by 4 contiguous 20 MHz channels). |
| Any unused value from 0 to 256 (flexible) | Indicates 2 secondary channels immediately above the primary channel and 1 secondary channel immediately below the primary channel (80 MHz bandwidth formed by 4 contiguous 20 MHz channels). |
| Any unused value from 0 to 256 (flexible) | Indicates 1 secondary channel immediately above the primary channel and 2 secondary channels immediately below the primary channel (80 MHz bandwidth formed by 4 contiguous 20 MHz channels). |
| Any unused value from 0 to 256 (flexible) | Indicates configuration of positions of each of the 3 secondary channels relative to the primary channel where the 80 MHz bandwidth is not formed by 4 contiguous 20 MHz channels. Many such configurations are possible and each may have a value associated with it. |
| Any unused value from 0 to 256 (flexible) | Indicates configuration of the position of the secondary channel relative to the primary channel where a 40 MHz bandwidth is not formed by 2 contiguous 20 MHz channels. Many such configurations are possible and each may have a value associated with it. |
| Any unused value from 0 to 256 (flexible) | Indicates configuration of secondary channels for VHT Multi-channel transmission relative to the primary channel. Many such configurations are possible and each may have a value associated with it. |
| Remaining up to 255 | Not used. |

The VHT operation information or VHT operation IE may be included in signaling messages, such as a fast transition (FT) action request frame and an FT action response frame. The VHT operation information or VHT Operation IE may be included in signaling such as measurement pilot frame, AP channel request element, AP channel report element, neighbor report element, neighbor report request frame, a neighbor report response frame.

Figure 7:
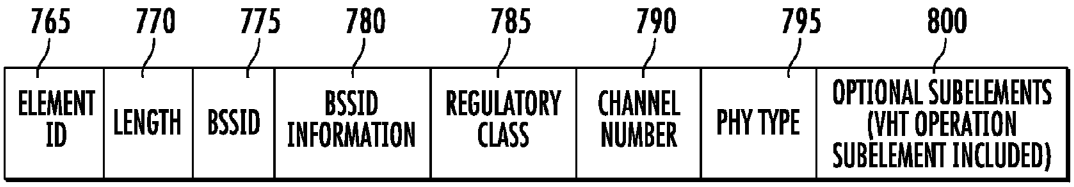
FIG. 7 shows the modification of a neighbor report element to include VHT operation information.

The optional subelements of the neighbor report element can include a VHT operation element (with the same format as the VHT operation IE) for the neighbor AP (being reported) with a subelement ID assigned to it. These modifications to the neighbor report element are shown in FIG. 7. Following the element ID 765, the length field 770 is variable and depends on the number and length of optional subelements. Each report element may describe an AP and consists of BSSID 775, BSSID Information 780, Regulatory Class 785, Channel Number 790, PHY Type 795, and may include optional subelements 800. The BSSID 775 may be the BSSID of the BSS being reported. The subsequent fields in the Neighbor Report Element pertain to this BSS. The BSSID Information field 780 may be used to help determine neighbor service set transition candidates.

The VHT operation information or VHT operation IE may be included in IEEE 802.11v signaling such as BSS transition management query/request/response frames.

The current VHT operation information may contain one or more bits to represent any of the VHT operation information, along with the HT operation information in a given frame.

VHT Capability Information

A given VHT feature may have more than one parameter and/or option associated with it. Moreover, the feature parameter may represent more than one value. The VHT feature itself may be optional. This may give rise to more than one mode of operation for a VHT AP or VHT WTRU, based on the chosen feature option and/or parameters.

Similarly, due to the optional features, more than one possible implementation of a VHT WTRU and a VHT AP may exist. This may give rise to a situation where a VHT AP or VHT WTRU supports a certain set of features and/or parameters, while another VHT AP or VHT WTRU supports a different set of features and/or parameters. Therefore, each VHT AP or VHT WTRU may advertise its capabilities, for example, a set of features and/or parameters, in order to establish a communication link. There may be negotiation of acceptable capabilities during the communication link setup based on the capabilities of the VHT devices (VHT APs and/or VHT WTRUs) involved in the communication link.

VHT WTRUs in an Infrastructure BSS, Independent BSS/Ad hoc, or Direct Link Setup scenario may indicate VHT capabilities. In an Infrastructure BSS scenario, VHT APs may indicate VHT capabilities as well.

The AP and WTRUs may indicate VHT capabilities information, in any new or existing management/control/data frames, for example, in management frames such as Association, Reassociation, Probe or Beacon frames. The VHT capabilities information may be added to existing IEs, for example, 802.11 Capabilities IEs. Alternatively, the VHT capabilities information may be carried in a newly defined Capabilities IE.

Figure 8:
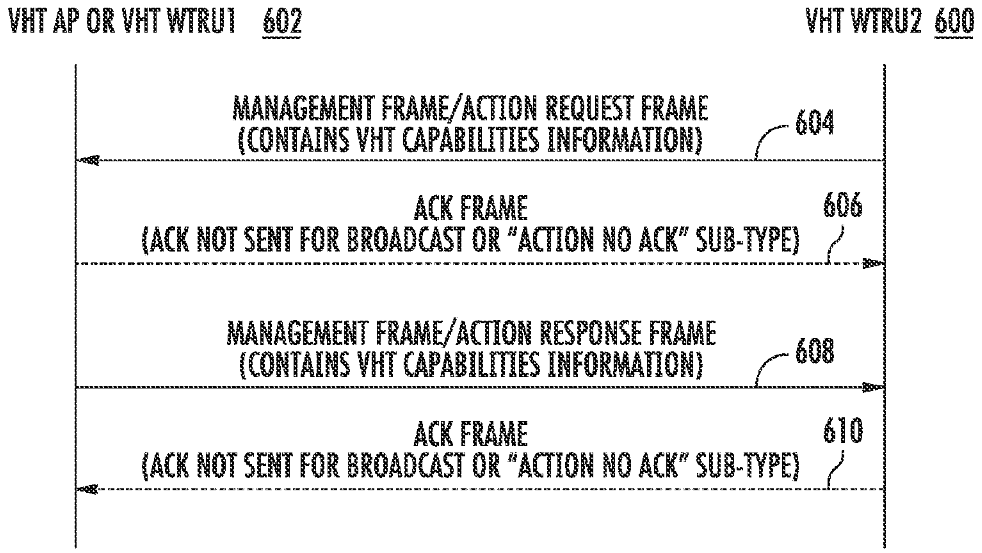
FIG. 8 is a diagram of an example of VHT Capabilities Information sent in management frames.

FIG. 8 is a diagram of an example of VHT capabilities information exchange between a VHT AP or WTRU1 602 and a VHT WTRU2 600. The VHT WTRU2 600 sends an action request frame 604 containing VHT capabilities information to the VHT AP or WTRU 602. The VHT AP or WTRU1 602 returns an ack frame 606, or optionally not in response to a broadcast or "action no ack" message. The VHT AP or WTRU1 602 responds with a management frame/action response frame 608 containing VHT capabilities information to the VHT WTRU 600. The VHT WTRU2 600 may return an ack message 610 unless the message was a broadcast or action no ack message.

Figure 9:
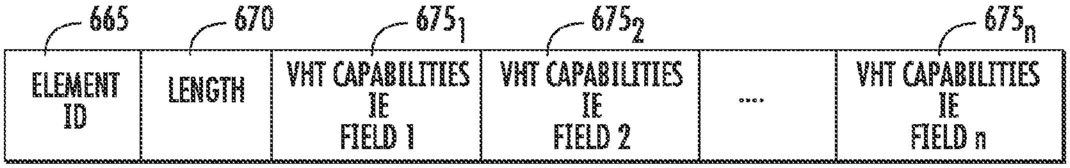
FIG. 9 is a diagram of an example VHT Capabilities Information Element format.

In one embodiment, the VHT capabilities information may be formatted as a VHT Capabilities IE. FIG. 9 shows the structure of an example VHT Capabilities IE. The Element ID 665 of the VHT Capabilities IE may have a newly defined value specifically for the VHT Capabilities IE. The Length field 670 may contain the length of the VHT Capabilities IE following the Element ID field 665. The fields 675 in the VHT Capabilities IE, following the Element ID 665 and Length fields 670 may contain some or all of the VHT capabilities information described below. For example, in FIG. 9 there are "n" such fields. Note that any specific mapping of these fields to the VHT capabilities information may be chosen and several mappings may be possible.

The VHT Capabilities IE may be included by an AP or WTRU, in any new or existing management/control/data frames, for example, in management frames such as the Beacon, secondary or auxiliary beacon, Association Request, Association Response, Reassociation Request, Reassociation Response, Probe Request or Probe Response frames.

The VHT capabilities information or VHT Capabilities IE may include information related to one or more VHT capabilities information items from Table 3. The VHT Capabilities information may include parameters, options and capabilities indication for each VHT Capabilities Information item in Table 3.

TABLE 3

| VHT Capabilities Information items | Description |
|---|---|
| Coding capabilities for VHT WLAN | Higher rate coding, coding algorithms may be employed for VHT WLAN to enhance performance such as throughput and robustness. |
| Supported channel width set for VHT WLAN | The VHT WLAN may support various channel widths for eg. 20/40/80 MHz. |
| Transmission capabilities for non-contiguous channels for communication | Multiple channels may be used simultaneously for communication, for example, two 40 MHz channels that are not contiguous. An example of the possible secondary channel configurations and corresponding values (note that the exact numerical value may be chosen flexibly from the currently unused values within the range from 0 to 255) for the Secondary Channel Offset field corresponding to the VHT 80 MHz bandwidth transmission, VHT 40 MHz bandwidth transmission and VHT Multi-channel transmission is shown in Table 2 above. In one embodiment, the modified Secondary Channel Offset field which includes values for secondary channel configurations supporting VHT 80 MHz bandwidth transmission, VHT 40 MHz bandwidth transmission and VHT Multi-channel transmission may be included in: (1) the beacon, probe response, association response, and reassociation response frames sent by the AP or an WTRU in an Independent BSS (2) a VHT Operation IE included in frames sent by an AP or an WTRU in an Independent BSS (3) Channel Switch Announcement (Action) frame sent by the AP or an WTRU in an Independent BSS (4) a VHT Capabilities IE included in frames sent by an AP or an WTRU. |
| Reception capabilities for non-contiguous channels for communication | Multiple channels may be used simultaneously for communication, for example, two 40 MHz channels that are not contiguous. See also, notes above regarding Transmission capabilities for non-contiguous channels for communication. |
| Transmission capabilities for asynchronous communication over non-contiguous channels | The multiple channels that are non-contiguous used for transmission simultaneously with data flow on the channels being asynchronous. |
| Reception capabilities for asynchronous communication over non-contiguous channels | The multiple channels that are non-contiguous may be used for transmission simultaneously with data flow on the channels being asynchronous. |

TABLE 3-continued

| VHT Capabilities Information items | Description |
|---|---|
| Power Saving capabilities for VHT WLAN | With various types of devices and applications on VHT WLANs there may be a need for suitable power saving mechanisms. |
| VHT Greenfield capabilities indicating support for reception of packets with VHT Greenfield format | During Greenfield operation (i.e. no legacy devices and only VHT devices being present) the packets may be allowed to be transmitted in a Greenfield format (i.e. with efficient preambles designed for VHT packets). |
| Short GI support for reception of packets transmitted with a 80 MHz bandwidth | The VHT WLAN may support 80 MHz bandwidth transmissions with a short Guard Interval in the Physical Layer. |
| Transmit Capabilities for VHT STBC packets | VHT WLAN may use Space Time Block Coding (STBC) mechanisms to increase throughput. |
| Receive Capabilities for VHT STBC packets | VHT WLAN may use STBC mechanisms to increase throughput. |
| Block Ack Capabilities for VHT WLAN | For VHT WLANs Block Acknowledgement (Note: A Block Ack acknowledges the reception of a Block of packets) mechanisms may be needed for multi-user aggregation in the uplink; multi-user aggregation in the downlink; multi-user MIMO in the uplink; multi-user MIMO in the downlink. |
| Maximum multi-user aggregation packet length | VHT WLANs may need to support multi-user packet aggregation mechanism to increase data throughput. |
| Indication of use of DSSS/CCK mode in a 80 MHz BSS operation | VH WLANs the BSS may allow (or not allow) direct sequence spread spectrum (DSSS) and complementary code keying (CCK) modes of operation in 80 MHz BSS operation. An WTRU may (or may not) use DSSS/CCK modes of operation in 80 MHz. |
| 80 MHz Intolerant indication | A VHT WTRU may indicate this to prevent the receiving VHT AP from operating the BSS in 80 MHz mode. |
| 40 MHz Intolerant indication | A VHT WTRU may indicate this to prevent the receiving VHT AP from operating the BSS in 40 MHz mode. |
| 20/80 MHz Intolerant indication | A VHT WTRU may indicate this to prevent the receiving VHT AP from operating the BSS in 20/80 MHz mode. |
| 20/40 MHz Intolerant indication | A VHT WTRU may indicate this to prevent the receiving VHT AP from operating the BSS in 20/40 MHz mode. |
| 20/40/80 MHz Intolerant indication | A VHT WTRU may indicate this to prevent the receiving VHT AP from operating the BSS in 20/40/80 MHz mode. |
| 40/80 MHz Intolerant indication | A VHT WTRU may indicate this to prevent the receiving VHT AP from operating the BSS in 40/80 MHz mode. |
| Legacy Protection support in VHT WLAN | Legacy devices (i.e. based on 802.11 standard prior to VHT WLAN) operation may be supported using legacy signal protection mechanisms. |
| Packet Aggregation parameters for VHT WLAN | VHT devices may have different capabilities to receive VHT packet aggregation such as: (1) maximum length of a multiuser packet aggregation and/or (2) minimum time separation between aggregated packets for proper reception. |
| Supported MCS set for VHT WLAN | Higher MCSs (Modulation and Coding Schemes) may be used in VHT WLANs than in legacy systems for higher throughput. |
| Capabilities to provide VHT MCS Feedback for VHT WLAN | MCSes may be used in VHT WLANs which may require corresponding feedback from receiver to transmitter. |
| Support for VHT Phased coexistence of 20/40/80 MHz and combinations of these bandwidths | VHT WLAN BSS may adopt a VHT Phased Coexistence Operation where the VHT AP may divide time between 20/40/80 MHz bandwidth operation. Note that all possible combinations may be considered, for example, 20/40/80 GHz, 40/80 GHz, 20/80 MHz, 20/40 MHz. The AP may switch the BSS operation amongst |

TABLE 3-continued

| VHT Capabilities Information items | Description |
|---|---|
| | the chosen bandwidths (i.e., 20/40/80 MHz phases) for phased coexistence operation. |
| VHT PCO Transition Time | Time duration for switching between communication bandwidths, for example, from 40 MHz to 80 MHz in PCO operation. |
| VHT Control field support | May indicate support of the Very High Throughput Control field which may be used for sending VHT Control information and may be included in data/control/management frames. |
| VHT Reverse Direction protocol Responder capabilities | The existing Reverse Direction protocol (for an initiator device to grant a part of its transmit opportunity to a responder device) may be extended for VHT operation, for example, in a Multi-user MIMO scenario. For example in Downlink (AP to WTRU) MU-MIMO where AP communicates with several WTRUs at the same time, the AP may grant Reverse Direction transmission time to one or more of the WTRUs following the AP transmission. This grant of transmission time by the AP will be within the transmit opportunity (TXOP) duration that it has under its control. |
| VHT Transmit Beamforming Capabilities/parameters | Transmit beamforming features for VHT WLAN may be needed for example in Multi-user MIMO operation. |
| VHT Antenna Selection Capabilities/parameters | Antenna Selection features for VHT WLAN may be needed for example in Multi-user transmit/receive operation. |
| Power Control for VHT WLAN capabilities/parameters | Power control may be needed in VHT WLAN in many scenarios such as: (1) Overlapping Basic Service Set (OBSS) interference reduction (2) Uplink Multiuser MIMO. Since the WTRUs will transmit simultaneously on the Uplink MU-MIMO it will benefit the receiver if the received power levels at the AP are not too disparate so that all of the WTRUs may be received with adequate quality. In order to achieve this the transmit power levels of the WTRUs may have to be adjusted based on their location and channel conditions. |
| Downlink Multi-user MIMO capabilities/parameters | Downlink Multi-user MIMO may be needed in VHT WLAN to increase downlink throughput. |
| Uplink Multi-user MIMO capabilities/parameters | Uplink Multi-user MIMO may be needed in VHT WLAN to increase uplink throughput. |
| Capabilities for Ranging signaling for power control | The AP may process received ranging signaling from a WTRU to recommend to the WTRU a transmit power adjustment, for example, in an uplink Multiuser MIMO scenario. |
| Capabilities for Ranging signaling for synchronization | The AP may process received ranging signaling from a WTRU to recommend to the WTRU a transmit timing offset adjustment, for example, in an uplink Multiuser MIMO scenario. Since the WTRUs will transmit simultaneously on the Uplink MU-MIMO it will benefit the receiver if the received signals at the AP are synchronized so that all of the WTRUs may be received with adequate quality. In order to achieve this the transmit times of the WTRUs may have to be adjusted based on their location and channel conditions. |
| Capabilities for OFDMA in VHT WLAN | OFDMA may be employed in VHT WLAN by performing channel/sub-carrier assignments for traffic/users. |
| Capabilities for frequency reuse mechanisms | Frequency reuse mechanisms may be employed to coexist with neighboring VHT APs/OBSSs An example may be increasing spectrum efficiency by reusing some |

TABLE 3-continued

| VHT Capabilities Information items | Description |
| --- | --- |
| | frequencies from the frequency spectrum more often for WTRUs closer to the AP. This may alleviate the spectrum scarcity problem in densely deployed VHT APs (i.e., interfering Neighboring/Overlapping BSSs). |
| Capabilities for Dynamic Frequency Selection | Due to interference from Overlapping BSS or neighboring BSS VHT APs and VHT WTRUs may select frequencies for operation in a dynamic way. |
| Capabilities for VHT Channel Switching | VHT APs and VHT WTRUs may switch channels. |
| Capabilities for VHT Channel Switching and Bandwidth switching | VHT APs and VHT WTRUs may switch channels and bandwidths which may be 20/40/80 MHz wide. |
| Capabilities for VHT Link Adaptation | Link Adaptation mechanisms may be supported for VHT WLANs in scenarios such as: (1)Multi-channel transmission (2) Multiuser MIMO. |
| Capabilities for VHT Channel State Information (CSI) feedback | VHT Channel State Information (CSI) feedback mechanisms may be supported for VHT WLANs in scenarios such as: (1) Multi-channel transmission (2) Multiuser MIMO. |
| Capabilities for VHT Channel sounding | VHT Channel sounding mechanisms may be supported for VHT WLANs in scenarios such as: (1) Multi-channel transmission (2) Multiuser MIMO. |
| Capabilities for OBSS management | VHT WLANs may adopt Overlapping BSS coping mechanisms to deal with the excessive channel reuse and interference in scenarios with densely deployed VHT APs. |
| Capabilities for VHT Frequency reuse mechanisms | VHT WLANs may need an AP/WTRU to be able to receive VHT frequency reuse information of neighboring BSSs and transmit VHT frequency reuse information of its BSS. |
| Capabilities for VHT Channel Scanning | VHT WLANs may need WTRUs/APs to be able to scan the channels in the spectrum to make measurements according to specified VHT information/parameters for channels and channel bandwidths. |
| Capabilities for Coexistence | VHT WLANs may need APs/WTRUs to support parameters, rules, policies, mechanisms and regulatory information for coexistence (for example, inter-BSS, inter-system or Television White Space(TVWS)). Some of the mechanism may include sharing of information amongst BSSs on channel usage. |

The VHT capabilities information or VHT Capabilities IE may be included in signaling messages, such as a Fast Transition (FT) action request frame and an FT action response frame. The VHT capabilities information or VHT Capabilities IE may also be included in signaling such as measurement pilot frame, AP channel request element, AP channel report element, neighbor report element, neighbor report request frame, a neighbor report response frame.

In one embodiment, the BSSID IE in the Neighbor Report element may have one or more bits indicating VHT. When the BSSID IE is set to a given value, the AP represented by the indicated BSSID may be a VHT AP that has contents of its VHT Capabilities element identical to that of the AP sending the Neighbor Report element. In addition, the optional subelements of the Neighbor Report element may include a VHT Capabilities element (with the same format as the VHT Capabilities IE) for the neighbor AP being reported with a new subelement ID assigned to it.

Figure 10:
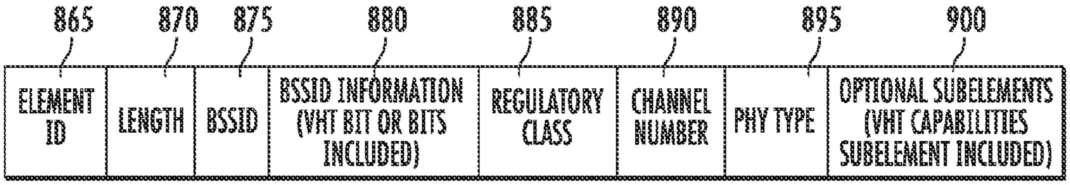
FIG. 10 is a diagram of an example modification to a Neighbor Report Element to include VHT Capabilities Subelement Information.

These modifications to the Neighbor Report Element are shown in FIG. 10. Following the element ID 865, the length field 870 is variable and depends on the number and length of optional subelements. Each report element may describe an AP and consists of BSSID 875, BSSID Information 880, Regulatory Class 885, Channel Number 890, PHY Type 895, and may include optional subelements 900. The BSSID 875 may be the BSSID of the BSS being reported. The subsequent fields in the Neighbor Report Element may pertain to this BSS. The BSSID Information field 880 may be used to help determine neighbor service set transition candidates.

The VHT capabilities information or VHT Capabilities IE may be included in signaling such as BSS Transition Management Query/Request/Response frames. The VHT capabilities information or VHT Capabilities IE may be included in any direct link setup (DLS), for example, tunneled DLS (TDLS) frames. For example, the VHT Capabilities IE may be included in the TDLS setup request/response frames. It may also be included in the DLS setup request/response frames.

In one embodiment, the 802.11 high throughput (HT) capabilities information may contain one or more bits to represent any of the VHT capabilities information in Table 3 along with the HT capabilities information in a given frame.

Many other variants are possible. A few variants may be generated by merely changing the order of newly added fields in the frame/message formats. Other variants are possible, by using only some of the fields proposed. It should be fully appreciated and noted that all such variants are within the scope of this invention.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, application specific integrated circuits (ASICs), application specific standard products (ASSPs), field programmable gate arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, mobility management entity (MME) or evolved packet core (EPC), or any host computer. The WTRU may be used in conjunction with modules, implemented in hardware and/or software including a software defined radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a near field communication (NFC) module, a liquid crystal display (LCD) display unit, an organic light-emitting diode (OLED) display unit, a digital music player, a media player, a video game player module, an Internet browser, and/or any wireless local area network (WLAN) or ultra wide band (UWB) module.

What is claimed is:

1. A wireless transmit and receive unit (WTRU) comprising:

a transmitter configured to transmit, to an access point (AP), a management frame comprising very high throughput (VHT) capabilities information, wherein the VHT capabilities information comprises an indication of support for reception via non-contiguous channels; and a receiver configured to receive, on a condition that reception via non-contiguous channels is supported, at least one data packet, from the AP, via multiple non-contiguous channels.

2. The WTRU of claim 1, wherein the VHT capabilities information comprises power control information.

3. The WTRU of claim 1, wherein the VHT capabilities information comprises frequency reuse capabilities.

4. The WTRU of claim 1, wherein the non-contiguous channels are used simultaneously.

5. The WTRU of claim 1 wherein each of the non-contiguous channels is formed from a group of contiguous channels.

6. A method of communicating very high throughput (VHT) capability information from a wireless transmit/receive unit (WTRU) comprising:

transmitting a management frame comprising VHT capabilities information to an access point (AP), wherein the VHT capabilities information comprises an indication of support for reception via non-contiguous channels; and receiving at least one data packet from the AP via multiple non-contiguous channels, on a condition that reception via non-contiguous channels is supported.

7. The method of claim 6, wherein the VHT capabilities information comprises power control information.

8. The method of claim 6, wherein the VHT capabilities information comprises frequency reuse capabilities.

9. The method of claim 6, wherein the non-contiguous channels are used simultaneously.

10. The method of claim 6 wherein each of the non-contiguous channels is formed from a group of contiguous channels.

11. An access point (AP) comprising:

a receiver configured to receive a management frame comprising very high throughput (VHT) capabilities information from a wireless transmit/receive unit (WTRU), wherein the VHT capabilities information comprises an indication of support for reception via non-contiguous channels; and a transmitter configured to transmit, on a condition that reception via non-contiguous channels is supported, at least one data packet, to the WTRU, via multiple non-contiguous channels.

12. The AP of claim 11, wherein the VHT capabilities information comprises power control information.

13. The AP of claim 11, wherein the VHT capabilities information comprises frequency reuse capabilities.

14. The AP of claim 11, wherein the non-contiguous channels are used simultaneously.

15. The AP of claim 11, wherein each of the non-contiguous channels is formed from a group of contiguous channels.

16. A method of communicating very high throughput (VHT) capability information to an access point (AP) comprising:

receiving a management frame comprising very high throughput (VHT) capabilities information from a wireless transmit/receive unit (WTRU), wherein the VHT capabilities information comprises an indication of support for reception via non-contiguous channels; and transmitting at least one data packet to the WTRU via multiple non-contiguous channels, on a condition that reception via non-contiguous channels is supported.

17. The method of claim 16, wherein the VHT capabilities information comprises power control information.

18. The method of claim 16, wherein the VHT capabilities information comprises frequency reuse capabilities.

19. The method of claim 16, wherein the non-contiguous channels are used simultaneously.

20. The method of claim 16, wherein each of the non-contiguous channels is formed from a group of contiguous channels.

* * * * *